(No Model.) 2 Sheets—Sheet 1.
P. MAUSER.
SHELL EXTRACTOR FOR BOLT GUNS.
No. 467,180. Patented Jan. 19, 1892.
Fig: 1.
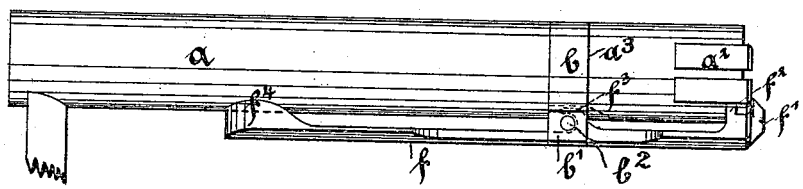
Fig: 2.
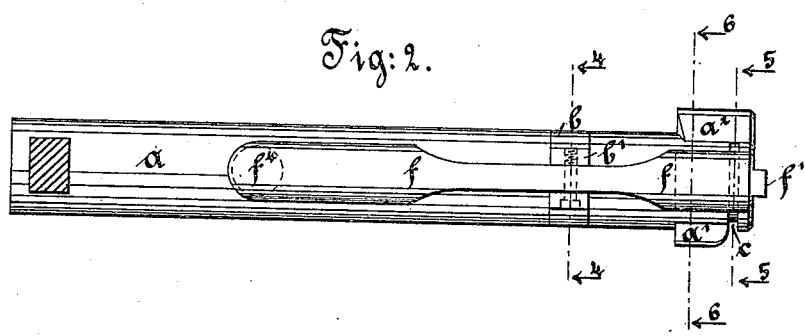
Fig: 4.
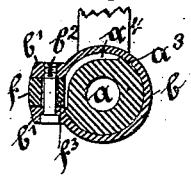
Fig: 3.
Fig: 5.
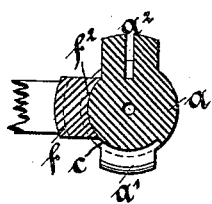
Fig: 6.
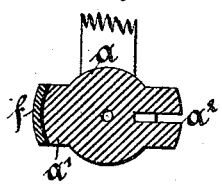
Fig: 7.
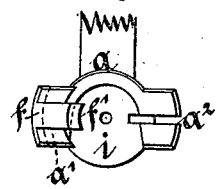
WITNESSES:
Fred White
John Becker
INVENTOR:
Paul Mauser,
By his Attorneys
Arthur E. Fraser & Co.

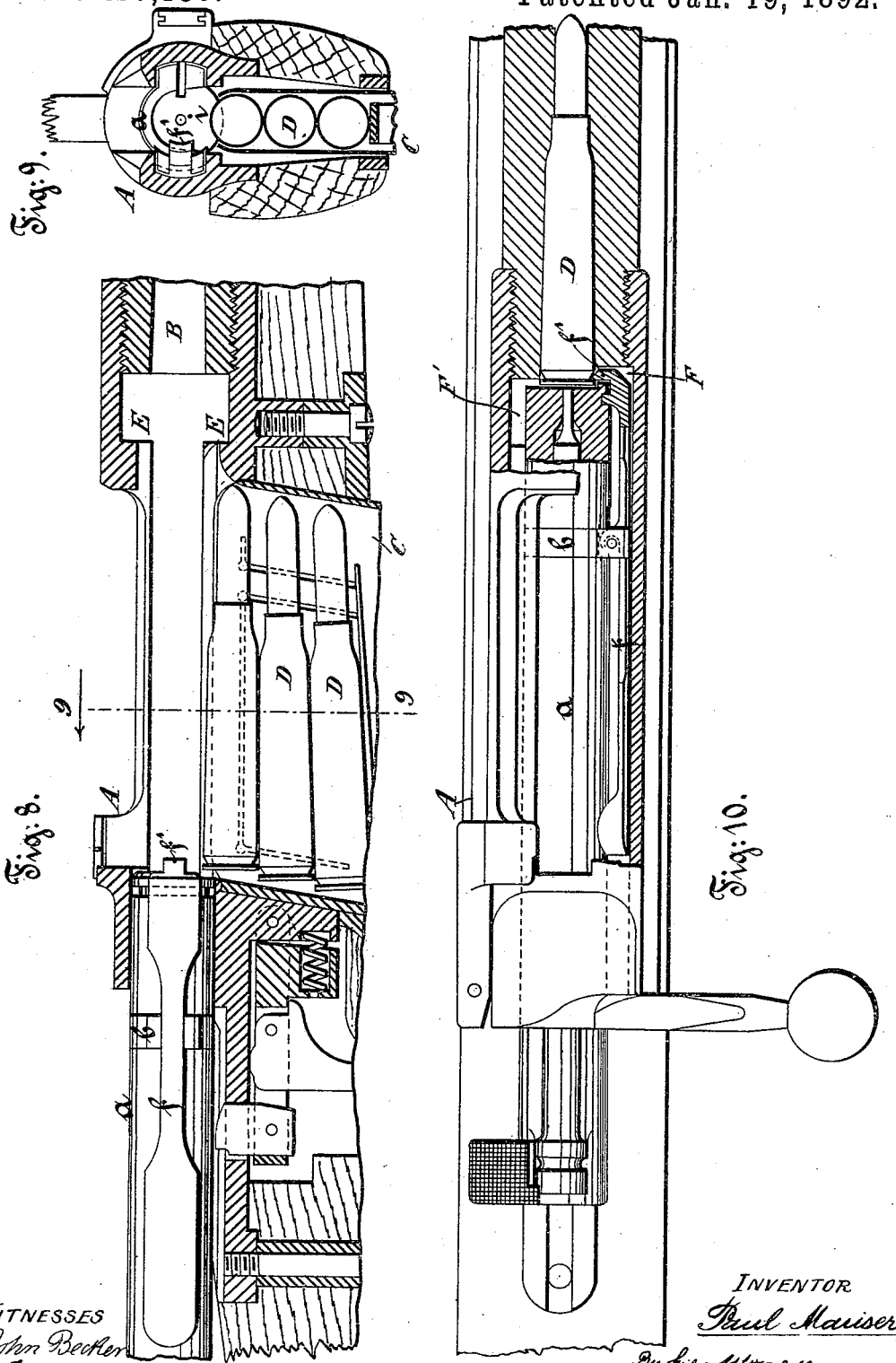

UNITED STATES PATENT OFFICE.

PAUL MAUSER, OF OBERNDORF-ON-THE-NECKAR, GERMANY, ASSIGNOR TO THE WAFFENFABRIK MAUSER, OF SAME PLACE.

SHELL-EXTRACTOR FOR BOLT-GUNS.

SPECIFICATION forming part of Letters Patent No. 467,180, dated January 19, 1892.

Application filed May 22, 1891. Serial No. 393,686. (No model.)

*To all whom it may concern:*

Be it known that I, PAUL MAUSER, a subject of the King of Würtemberg and Emperor of Germany, and a resident of Oberndorf-on-the-Neckar, in the Kingdom of Würtemberg, German Empire, have invented certain new and useful Improvements in Cartridge-Shell Extractors for Breech-Loading Bolt-Guns, of which the following is a specification.

The invention relates to that part of the bolt-gun which draws the empty cartridge-shells out of the barrel, and is usually called an "extractor," and this invention comprises certain improvements in such extractors, whereby they become more reliable in action and stronger in construction.

The new extractor is most particularly intended for guns, the bolts of which are furnished with recoil or locking projections on their front end without separate locking-heads; but, if desired, it may be used with bolts which have separate locking-heads.

In the accompanying drawings, Figure 1 is a plan view of a bolt with the new extractor in the closed position. Fig. 2 is a side elevation thereof. Fig. 3 is a side elevation of the extractor separated from the bolt, looking toward its inner side. Fig. 4 is a cross-section on the line 4 4 of Fig. 2. Fig. 5 is a cross-section on the line 5 5 in Fig. 2. Fig. 6 is a cross-section on the line 6 6 in Fig. 2, but showing the parts in the open position; and Fig. 7 is a front view of the bolt and extractor in the open position. Fig. 8 is a fragmentary axial section of the breech-case, magazine, and barrel of a bolt-gun, showing the bolt and cartridge-extractor in elevation in the open position. Fig. 9 is a fragmentary cross-section thereof cut on the line 9 9 in Fig. 8 and looking in the direction of the arrow. Fig. 10 is a fragmentary plan of the breech-case, barrel, and bolt, showing the latter in the closed position, the view being partly in horizontal axial section.

Referring to the drawings, $a$ represents the bolt having the usual locking projections $a'$ and $a^2$ at its forward end, and $f$ represents the cartridge-extractor carried by the bolt. Let A represent the breech-case; B, the barrel; C, the cartridge-magazine; D D, the cartridges; E E, the recesses in the breech-case A for the locking projections $a'$ $a^2$ of the bolt, and F F' the longitudinal grooves traversing the inner walls of the breech-case A for receiving the locking projections $a'$ $a^2$ when the bolt is slid longitudinally. The cartridge-extractor $f$ is shown as located in this instance in the groove F.

The bolt $a$ is of the class having a longitudinal sliding movement within the breech-case of a gun and an oscillatory movement for locking and unlocking. It is constructed with the usual recess $i$ in its forward end for receiving the base of a cartridge, which is usually inserted into the recess through a gap in the rim or wall surrounding the latter.

The extractor is constructed to be located in a horizontal groove, as F, formed for receiving it in the breech-case of a gun, being thereby held from rotation relatively to the cartridge or cartridge-shell, while the bolt $a$, carrying the extractor, is, as usual, capable of turning through a quarter-revolution or thereabout for the purpose of locking and unlocking the same. At a distance of about an inch, more or less, to the rear of the locking projections $a'$ $a^2$ an annular groove or recess $a^3$ is formed around the bolt $a$ to receive a divided ring $b$, provided with a pair of perforated ears $b'$ $b'$ to receive a screw-pin $b^2$, engaging a lug or hook $f^3$ on the inner side of the extractor $f$, whereby the extractor $f$ is connected to the ring $b$ and also to the bolt $a$. The hook $f^3$ is received in a suitable recess $a^4$, milled in the bolt $a$ at the bottom of the annular groove $a^3$ for the ring $b$, as shown in Fig. 4. This groove extends throughout about a quarter of the circumference of the bolt $a$ to permit oscillatory motion of the latter independently of the extractor $f$. The extractor $f$ extends considerably to the rear of the ring $b$ and ends in a thickened tail $f^4$, bearing against the cylindrical wall of the bolt $a$. As the bolt $a$ slides horizontally the extractor works to and fro in a straight groove F, formed, as usually, in the breech-case of the gun. This last-mentioned groove is that usually provided in the breech-case to receive the locking projection $a'$ as the bolt $a$ is slid back and forth. By these means the extractor is given the required stability. At the front end the extractor $f$ is provided with the extractor-claw $f'$, and is shaped to fit the front, back, and outer surface of the locking projection $a'$ and yet pass freely over the latter, so that it will not interfere with the oscillatory movement of the bolt.

To sustain the extractor $f$ against the horizontal pull exerted by the extractor-claw $f'$ in extracting a shell, the front portion of the extractor in the rear of the claw $f'$ is provided on its inner side with a projecting cross-rib $f^2$, fitting into a corresponding groove $c$ in the bolt $a$ in front of the locking projection $a'$, which latter is sufficiently cut away in front to make room for the said rib $f^2$. The groove is formed around a suitable portion of the circumference of the bolt $a$ to allow the latter to be freely turned for locking and unlocking. Providing the extractor with the said rib $f^2$, fitting the groove $c$ of the bolt $a$ in front of the projection $a'$, considerably lessens the possibility of its being forced outward by the strain caused in extracting a shell, as this arrangement supports the extractor close up to its work. The extractor-claw $f'$ is placed on the horizontal axis of the extractor $f$, (see Fig. 7,) or it may be a little lower, so that the cartridge on being pushed up through the gap in the projecting rim of the recess $i$ in the forward end of the bolt $a$ into position for charging the gun is infallibly seized and held firmly by the extractor-claw $f'$. By the same means the shell or cartridge is also prevented from slipping again downward by itself.

I claim as my invention in cartridge-shell extractors for breech-loading bolt-guns the following defined novel features and combinations, substantially as hereinbefore specified, namely:

1. The combination, with an oscillatory bolt having a recoil projection and a groove $c$ near its front end and constructed rearwardly of said projection with an annular groove surrounding it, of a ring engaging said annular groove in the bolt and a shell-extractor consisting of a flat metal body provided on its front end with a claw, having a cross-rib $f^2$, engaging with said groove $c$ of the bolt, constructed near its rear end with a tail-piece bearing against the bolt and having a hook on its inner side engaging with said ring, whereby the extractor is kept in connection with the bolt in such manner that the latter is free to be turned for closing and opening the breech independently of the extractor, while the extractor, guided by a horizontal groove of the breech-case, is compelled to follow all the to-and-fro motions of the bolt.

2. The combination, with the breech-case of a gun having the grooves F F', and a bolt having the recoil projections $a'\,a^2$ at its front end and formed at the rear of said projections with a peripheral groove $c$, extending partially around it, of a shell-extractor consisting of flat steel body $f$, adapted to enter one of said grooves in the breech-case and provided on its front end with a claw $f'$ and cross-rib $f^2$, fitting said groove $c$ of the bolt and provided at its rear end with a tail-piece $f^4$, bearing against the bolt, whereby the bolt and the extractor are connected to move together longitudinally, while the bolt is free to be turned for closing and opening the breech independently of the extractor, and the extractor is guided by said groove in the breech-case while following all the to-and-fro motions of the bolt, substantially as and for the purpose set forth.

In witness whereof I have hereunto signed my name in the presence of two subscribing witnesses.

PAUL MAUSER.

Witnesses:
LOUIS COLIN,
PAUL SEYBOLD.